Figure 1:
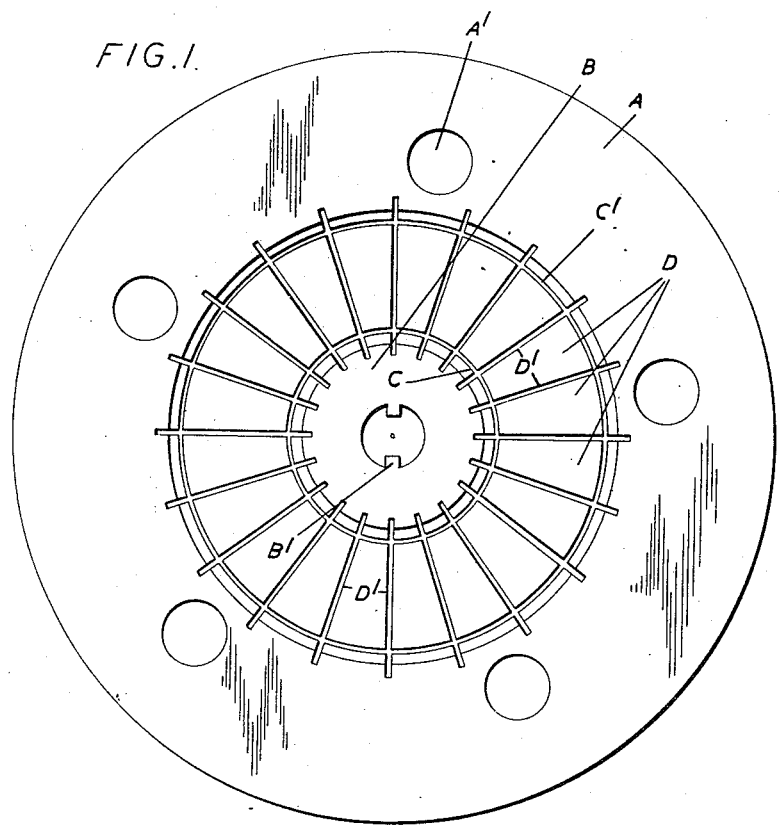

Jan. 26, 1954  R. S. EMERSON  2,667,183
FLEXIBLE PRESSURE-RESPONSIVE DIAPHRAGM
Filed Dec. 7, 1951  2 Sheets-Sheet 1

Inventor
REGINALD STANLEY EMERSON
By
Emery Holcombe & Blair
Attorney

Jan. 26, 1954  R. S. EMERSON  2,667,183
FLEXIBLE PRESSURE-RESPONSIVE DIAPHRAGM
Filed Dec. 7, 1951  2 Sheets-Sheet 2
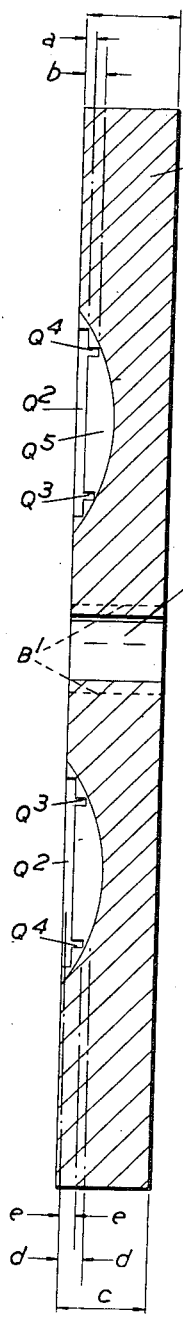
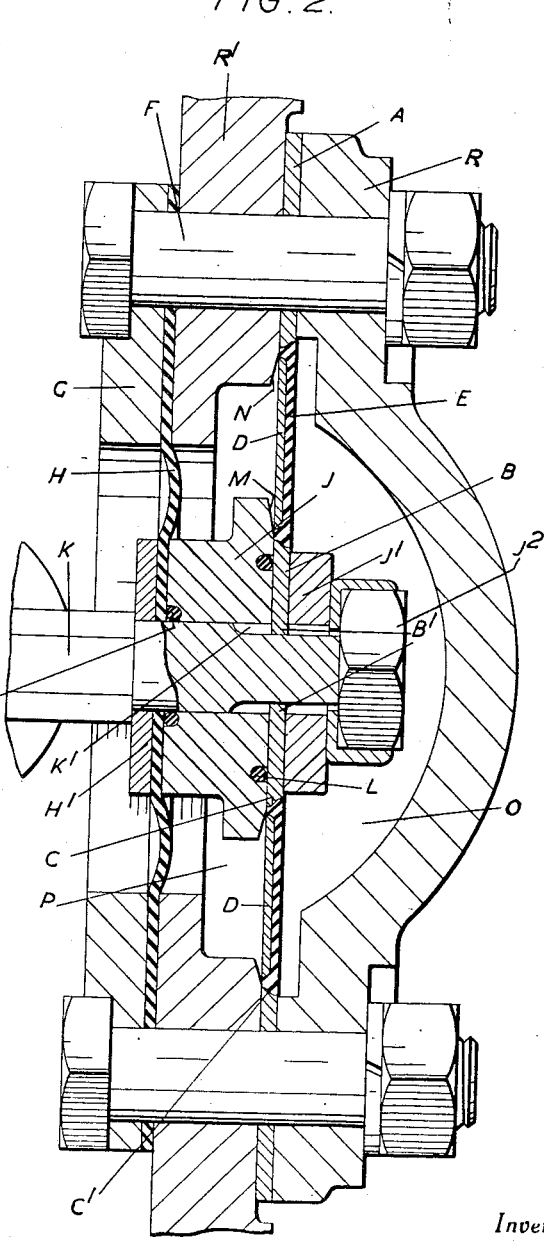
Inventor
REGINALD STANLEY EMERSON
By
Emery Holcombe & Blair
Attorney Patented Jan. 26, 1954

2,667,183

UNITED STATES PATENT OFFICE 2,667,183

FLEXIBLE PRESSURE-RESPONSIVE DIAPHRAGM

Reginald Stanley Emerson, London, England, assignor to D. Napier & Son Limited, London, England, a company of Great Britain Application December 7, 1951, Serial No. 260,348

Claims priority, application Great Britain January 3, 1951

3 Claims. (Cl. 137—788)

This invention relates to flexible pressure-responsive diaphragms of the kind comprising an annular comparatively rigid rim portion, a comparatively rigid central portion coaxial with the rim portion and of a diameter leaving an annular space between the central and rim portions, and an annular intermediate flexible portion permitting relative movement between the rim and central portions, in a direction normal to the general plane of the diaphragm, for example under the action of changes in the fluid pressure acting on the diaphragm.

In one form of such diaphragms as commonly formed, the annular rim portion and the central portion are formed as separate metal members and the annular intermediate flexible portion is formed by a disc of rubber or similar impervious flexible material the outer circumferential portion of which is clamped or otherwise rigidly secured to the rim portion while its inner circumferential edge is similarly clamped or otherwise rigidly secured to a face of the central portion. In an alternative form in common use the diaphragm is formed completely of thin metal with circumferential corrugations in its intermediate portion to render such portion flexible, while its rim and central portions are formed flat and usually clamped respectively between parts between which the diaphragm extends.

The known diaphragms in which the flexible annular portion is in the form of a flexible sheet or rubber or the like, have the advantage that the flexible portion has little or no inherent resilience and such diaphragms therefore are sensitive to small pressure changes and can be used where it is necessary or desirable that the flexible part of the diaphragm itself should have little or no natural resilience. Such diaphragms are, however, not suitable for use where the diaphragm has to withstand high fluid pressures, while moreover the tendency for distortion or bulging of the flexible material to occur with increases in pressure tends to make the law relating pressure changes to relative movement between the rim and central portions complex.

The object of the present invention is to provide an improved flexible diaphragm, primarily but not exclusively intended for use with pressure-operated or pressure-responsive control apparatus which will be suitable for use with comparatively high fluid pressures, will have little or no inherent resilience as regards its annular flexible portion within its operating range, and will also be such that over a wide pressure range the law relating the fluid pressure to the force applied to the centre part of the diaphragm will be a substantially straight line law.

To this end a flexible diaphragm according to the present invention comprises a rigid annular rim portion, a rigid central portion concentric with but spaced from the rim portion, and an annular intermediate flexible portion extending between the rim and the central portions, this intermediate flexible portion being constituted by a series of separate radially extending sections of rigid material spaced by narrow annular gaps from the central and rim portions, each section subtending a relatively small angle at the centre of the diaphragm and the sections being separated from one another by narrow slit-like radial gaps, and impervious flexible sheet material extending between and making a fluid-tight junction with the inner edge of the rim portion and the outer edge of the central portion and lying in contact with the radially extending sections so as to provide an impervious seal covering the gaps between the radially extending sections and between these sections and the rim and central portions.

A diaphragm according to the invention is intended to be used in association with inner and outer parts between which it extends, the inner circumferential edge of the outer part and the outer circumferential edge of the inner part overlapping to a small degree respectively the outer and inner ends of the individual radially extending sections of the intermediate portion of the diaphragm so that such inner and outer parts constitute in effect fulcra on which the ends of such radially extending sections bear and can pivot freely.

Thus each radially extending section is supported at its inner and outer end respectively on the two parts between which the flexible part of the diaphragm extends and the pressure acting on such flexible part of the diaphragm is transmitted directly to such parts through the ends of the radially extending sections which themselves form a support for the sheet of impervious flexible material extending over them and filling the narrow gaps between them and between their ends and the rim and central portions of the diaphragm.

Preferably the sheet of flexible material is bonded to the inner edge of the rim portion and to the outer edge of the central portion and to the faces of the radially extending sections of the intermediate portion over which it extends, and in any case it will be understood that the diaphragm will be arranged so that the face thereof exposed to the higher pressure is that over which the impervious flexible material extends so that the fluid pressure tends to assist rather than otherwise the close adherence of the flexible material to the rigid parts of the diaphragm.

A diaphragm according to the invention may be manufactured in various ways, but according to a further feature of the invention a method of forming such a diaphragm comprises machining in one face of a plate an annular recess with concentric inner and outer grooves in the face of the recess lying adjacent to, but slightly spaced respectively from, the inner and outer circumferential edges of the recess, and also machining in such face a series of radial grooves extending beyond the edges of the recess and cutting into the base of the recess, then filling the recess and the grooves associated therewith with plastic material which is then bonded thereto and grinding or otherwise machining down the face of the plate remote from the recess to a point beyond the bases of the concentric inner and outer grooves in the base of the recess referred to.

One construction of diaphragm according to the invention and a method of manufacturing it will now be described with reference to the accompanying drawings, in which:

Figure 1 is a front elevation of the diaphragm, shown without the flexible material, Figure 2 is a cross-section in a plane containing the axis of the diaphragm through an assembly in which the diaphragm is used, and Figure 3 is a cross-section in a plane, containing the axis of the diaphragm eventually produced, to illustrate the manner in which the diaphragm is made.

As shown in Figures 1 and 2, the diaphragm comprises a rigid annular rim portion A of metal having spaced holes $A^1$ therein, a rigid annular central portion B also of metal concentric with but spaced from the rim portion A, and an annular intermediate flexible portion extending between the rim A and the central portion B and spaced by narrow annular gaps C and $C^1$ respectively from the central portion B and the rim portion A, this intermediate flexible portion being constituted by a series of separate radially extending metallic sections D each subtending a relatively small angle at the axis of the diaphragm and separated from one another by narrow slit-like radial gaps $D^1$, and impervious flexible sheet material E extending between and making a fluid-tight junction with the inner edge of the rim portion A and the outer edge of the central portion B and lying in contact with and extending completely over the faces of the sections D on one side of the diaphragm and covering and extending into the gaps C, $C^1$ and $D^1$. Tongues $B^1$ are formed on the central portion B as shown.

When the diaphragm is incorporated in apparatus in which it is to be used the inner and outer ends of the sections D are arranged to rest upon abutments or fulcrum surfaces. Thus in the construction shown in Figure 2 the diaphragm is assembled between the two parts R and $R^1$ of a casing with its rim portion A clamped between annular faces respectively on the two parts of the casing by bolts F passing through the two parts of the casing and through a ring G by which the outer circumferential part of a flexible diaphragm H of other type is clamped to the rear face of the part $R^1$, while the central portion B of the diaphragm is clamped between clamping rings J, $J^1$ on the end of an axially movable pin or control member or shaft K by means of a nut $J^2$ engaging a screwthread on the end of the pin K and serving also to clamp the inner circumferential portion of the diaphragm H to the pin K by means of a clamping ring $H^1$. A sealing ring L is provided to prevent leakage of fluid along the part of the pin surrounded by the clamping rings J, $J^1$ and outwards between the faces of the ring J and central portion B of the diaphragm while a sealing ring $L^1$ provides a seal between the ring J and the pin K.

The tongues $B^1$ engage longitudinal grooves $K^1$ in the pin K as shown, to prevent rotation of the portion B of the diaphragm during assembly on the pin K.

As shown the ring J is provided with an inclined surface M on which the inner ends of the sections D rest and can pivot so that this surface forms a fulcrum for each of these inner ends while the part $R^1$ of the casing is provided with an inclined surface N which similarly acts as a fulcrum for the outer ends of the sections D. Each section D is thus pivotally supported on the frusto-conically shaped fulcrum surfaces M and N at its ends.

In the construction shown the diaphragm according to the invention lies between a high pressure chamber O and a low pressure chamber P and it will be seen that pressure acting on the diaphragm is thus transmitted by the sections D directly to the part $R^1$ of the casing through the fulcrum surface N and to the pin K through the fulcrum surface M, and that the sheet of impervious flexible material E is supported by the sections D except for the parts in the narrow radial gaps $D^1$ which, by reason of their limited area and substantial support from the surrounding parts, are well capable of withstanding high pressures.

The method of construction of a diaphragm according to the invention diagrammatically illustrated in Figure 3 is as follows: A circular metal plate Q of substantial thickness with a central hole $Q^1$ is machined in the manner indicated so as to provide in one face an annular recess $Q^2$ of a depth $(a)$ with concentric inner and outer grooves $Q^3$, $Q^4$ formed in the base of this recess and having a total depth $(b)$ measured from the adjacent face of the plate Q, these grooves being as shown slightly displaced respectively from the inner and outer circumferential edges of the recess $Q^2$. Also formed by machining in the same face of the plate Q is a series of radial grooves $Q^5$ of part-cylindrical form with a depth slightly exceeding that of the grooves $Q^3$ and $Q^4$ and a length measured radially of the plate Q such as to extend beyond the inner and outer circumferential edges of the recess $Q^2$. When the plate Q has been machined in the manner indicated the recess $Q^2$ and the grooves $Q^3$, $Q^4$, $Q^5$ associated with it are filled with plastic material of a kind which, after curing, will be of an impervious flexible nature, for example a synthetic rubber, and this material is then cured and during the curing bonded to the plate Q. The face of the plate Q containing the recesses $Q^2$, $Q^3$, $Q^4$, $Q^5$, now filled with impervious flexible material, and this flexible material is then machined down as by grinding so as to reduce the thickness of the plate Q as a whole to the dimension indicated at (c), following which the opposite face of the plate Q is machined down as by turning to the dimension (d) and then by grinding to the dimension (e), when it will be seen that the part of the plate Q between the grooves $Q^3$ and $Q^4$ will have been separated into a series of separate sections divided from one another by the narrow slots $D^1$ represented by the grooves $Q^5$ and bounded at their ends by the slots C and $C^1$ represented by the grooves $Q^3$ and $Q^4$, while the impervious flexible material will extend over the inner circumferential edge portion of the outer part A of the plate now represented by the part of the plate outside the groove $Q^4$ and over the outer circumferential portion of the central part of the plate now represented by the part of plate inside the groove $Q^3$.

In one particular example the plate Q may initially be, say, 3 inches in diameter and 1 inch thick and have a central hole $Q^1$ of ½ inch diameter, the recess $Q^2$ may have a depth of 0.3 inch, an external diameter of $1\frac{33}{32}$ inches and an internal diameter of, say, $\frac{23}{32}$ inches, each of the grooves $Q^3$, $Q^4$ having a width of, say $\frac{1}{64}$ of an inch and a depth measured from the adjacent face of the plate Q of, say, .06 inch, the mean diameter of the groove $Q^4$ being $1\frac{31}{32}$ of an inch while the mean diameter of the inner groove is $\frac{27}{32}$ of an inch, the width of each slot $Q^5$ being, say, $\frac{1}{64}$ of an inch while the final thickness of the plate after both faces have been ground is, say, about .04 inch with the final thickness of the plastic material on the sections D say .022 inch.

What I claim as my invention and desire to secure by Letters Patent is:

1. A flexible diaphragm comprising a rigid annular rim portion, a rigid central portion concentric with but spaced from the rim portion, and an annular intermediate flexible portion extending between the rim and the central portions, this intermediate flexible portion being constituted by a series of separate radially extending sections of rigid material, spaced by narrow annular gaps from the central and rim portions, each section sub-tending a relatively small angle at the centre of the diaphragm and the sections being separated from one another by narrow slit-like radial gaps, and impervious flexible sheet material extending between and making a fluid-tight junction with the inner edge of the rim portion and the outer edge of the central portion and lying in contact with the radially extending sections so as to provide an impervious seal covering and extending into the gaps between the radially extending sections and between these sections and the rim and central portions, said impervious flexible material being bonded to the parts over which it extends.

2. Fluid pressure responsive apparatus comprising a high pressure and a low pressure chamber, a flexible diaphragm extending and constituting a dividing wall between the high pressure and low pressure chambers and comprising a rigid annular rim portion, a rigid central portion concentric with but spaced from the rim portion, and an annular intermediate flexible portion extending between the rim and central portions, this intermediate flexible portion being constituted by a series of separate radially extending sections of rigid material spaced by narrow annular gaps from the central and rim portions, each section subtending a relatively small angle at the centre of the diaphragm and the sections being separated from one another by narrow slit-like radial gaps, and impervious flexible sheet material extending between and making a fluid tight junction with the inner edge of the rim portion and the outer edge of the central portion and lying in contact with the faces of the radially extending sections adjacent to the high pressure chamber so as to provide an impervious seal covering and extending into the gaps between the radially extending sections and between these sections and the rim and central portions, said flexible impervious material being bonded to the parts over which it extends, a control member connected to the central portion, and annular fulcrum surfaces in the low pressure chamber and respectively rigid with the walls of the chamber and the control member on which fulcrum surfaces can rest and pivot respectively the outer and inner ends of the radially extending sections.

3. Fluid pressure responsive apparatus as claimed in claim 2 in which the annular fulcrum surfaces are frusto-conical.

REGINALD STANLEY EMERSON.

References Cited in the file of this patent

UNITED STATES PATENTS

| Number | Name | Date |
|---|---|---|
| 1,466,243 | Neal | Aug. 28, 1923 |
| 2,275,712 | Zand | Mar. 10, 1942 |
| 2,554,003 | Burger | May 22, 1951 |

FOREIGN PATENTS

| Number | Country | Date |
|---|---|---|
| 297,216 | Great Britain | Sept. 20, 1928 |